June 24, 1930.    E. B. KIBBY    1,765,838
METHOD OF MAKING PIPE TONGS
Filed June 23, 1928    2 Sheets-Sheet 1
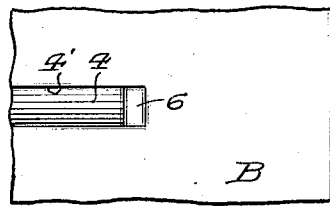
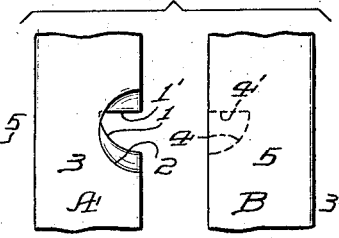
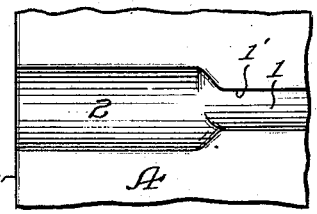
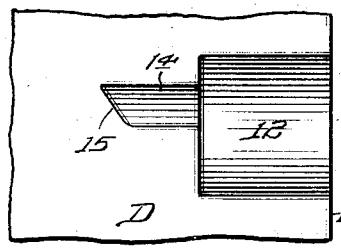
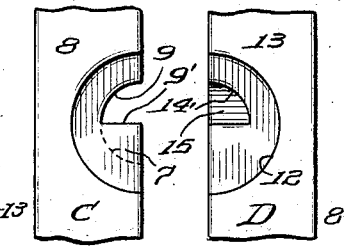
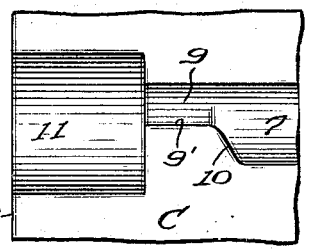
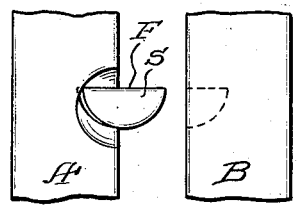
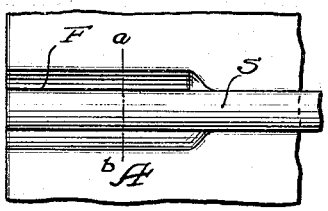
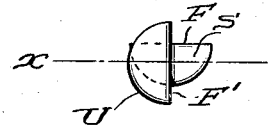
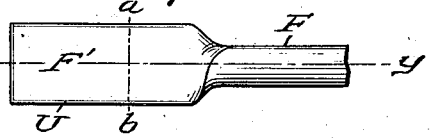
INVENTOR
Enoch B. Kibby
BY
ATTORNEYS
WITNESS
F. J. Hartman June 24, 1930.  E. B. KIBBY  1,765,838
METHOD OF MAKING PIPE TONGS
Filed June 23, 1928   2 Sheets-Sheet 2
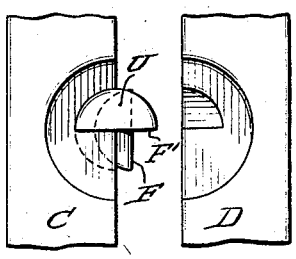
Fig. 6.
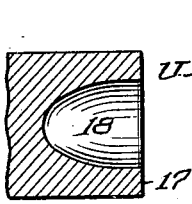
Fig. 7.
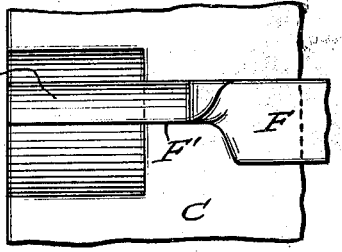
Fig. 6ᵃ.
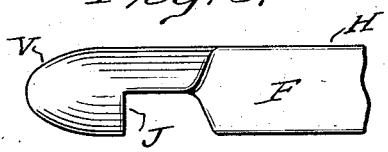
Fig. 8.
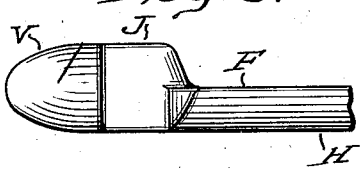
Fig. 9.
Fig. 10.  Fig. 11.  Fig. 12.
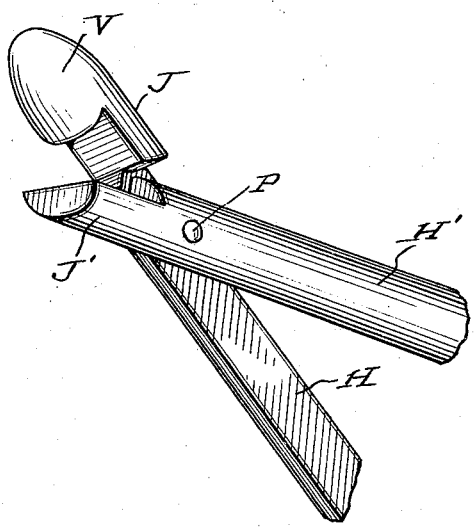
Fig. 13.
INVENTOR
Enoch B. Kibby
WITNESS Patented June 24, 1930

1,765,838

UNITED STATES PATENT OFFICE

ENOCH B. KIBBY, OF YOUNGSTOWN, OHIO

METHOD OF MAKING PIPE TONGS

Application filed June 23, 1928. Serial No. 287,861.

My invention particularly relates to the manufacture of tongs of the type employed in pipe manufacture for the purpose of withdrawing the heated skelp from the furnace and thereafter connecting the skelp with the mechanism by which it is drawn through a welding bell to form the pipe. Tongs intended for this purpose comprise a pair of relatively movable members pivoted together and each having a jaw cooperative with the jaw of the other member and a handle or leg of relatively considerable length. Since in the manufacture of butt weld pipe the tongs, after the skelp has been gripped, must be drawn through a welding bell whose smallest internal diameter is equal to the external diameter of the pipe to be formed, the maximum diameter of the tongs when closed or substantially closed must be slightly less for a given size of pipe than the external diameter of the latter so the tongs can freely pass through the bell; in consequence the tongs when closed present a slender, elongated appearance because of the relatively great length of their handles and their comparatively small diameter.

To be satisfactorily operative for their intended function all tongs for a given size of pipe should be uniform and positive in operation. Moreover, as a relatively large number of tongs are employed in each pipe mill in a varying range of sizes and as they are necessarily subjected to very severe conditions of use with consequent comparatively short life, a relatively small reduction in cost of manufacture of each pair of tongs amounts in the aggregate to a very considerable saving in the cost of operation of the pipe mill over a given period.

It has hitherto been customary to manufacture the tongs by first either hand-forging or drop-forging the tong bits or jaws separately from the handles and then uniting them to the latter by welding. These methods of manufacture are unsatisfactory because the hand-forged bits are neither uniform in size nor in shape, while the drop-forged bits though uniform in size and shape embody at the completion of the drop-forging operation fins of excess metal which must be removed by subsequent operations with consequent trouble and expense, while in either case the separately formed bits must be subsequently welded to the handles, thus adding to the cost of producing the completed tongs.

It is therefore the principal object of my invention to provide a novel method of manufacturing tongs by means of which strong, durable, uniform and satisfactory tongs can be produced in a simple, rapid and inexpensive manner.

A further object of my invention is to provide a method by which the jaw and handle of each of the complementary members of each pair of tongs can be formed as an integral unit, thus entirely avoiding the operation of welding the bits to the handles which heretofore has been necessarily incident to the manufacture of tongs, and to provide a method of manufacturing tongs by which the jaws or bits of the tongs can be produced with the uniformity requisite for satisfactory operation yet devoid of fins or other bodies of excess metal which have to be subsequently removed.

My invention further includes other objects, features, advantages and novel steps and operations hereinafter more particularly referred to or which will be apparent from the following description of a preferred manner of practising the invention in the production of tongs suitable for use in the manufacture of butt weld pipe or for analogous purposes.

To enable those skilled in the art to comprehend and practise the invention reference may now be had to the accompanying drawings in connection with the following description of the method of performing the invention which, viewed in its broader aspects, contemplates the formation of the jaw and handle of each of the complementary members of the tongs as an integral unit from a single length of suitable and preferably half-round stock by subjecting the ends of the stock to the successive action of suitable dies so as to form the jaws unitarily with that portion of the stock which is to form the handle of the member and then uniting the two members by pivoting them together. As the shape of the jaws of the two members necessarily differs somewhat, the operations incident to the formation of their respective jaws necessarily differ slightly as will hereinafter more fully appear although the same dies can be utilized and preferably are so utilized in the formation of the jaws of both members.

In the accompanying drawings I have illustrated in Figs. 1 to 2$^d$ inclusive the dies preferably used in the practice of the invention. Figs. 3 and 3$^a$ illustrate the position of the stock or work piece in the first set of dies preparatory to being acted on by them and Figs. 4 and 5 the shape of the work piece after they have acted upon it; Figs 6 and 6$^d$ illustrate the position of the work piece in the second set of dies preparatory to being acted on by them; Fig. 7 is a fragmentary central longitudinal section of the heading tool used to form the head on the "main jaw," as it may conveniently be termed, substantially simultaneously with the second die operation; Figs. 8, 9 and 10 illustrate the shape of the completed main jaw after the second die and heading operations, Fig. 8 being a fragmentary side elevation of the jaw, Fig. 9 a fragmentary plan view, and Fig. 10 an end view thereof. Figs. 11 and 12 respectively are views corresponding to Figs. 8 and 9 illustrating the completed auxiliary or unheaded jaw, and Fig. 13 is a perspective view showing the two members of the tongs assembled together. The same symbols are used to designate similar parts in the several figures.

It will be understood that the dies ordinarily consist of rectangular blocks of metal adapted to be seated in the housings or die holders of a suitable forging machine (not shown) as will be readily understood by those familiar with the art. Consequently, in the drawings only those portions of the dies which actually operate upon the stock are illustrated.

Referring now to the first set of dies shown in Figs. 1, 1$^a$ and 1$^b$, Fig. 1 is a front end view of the two dies A and B separated to permit introduction of the stock, while Fig. 1$^a$ is a face view of the die B and Fig. 1$^b$ a face view of the die A. It will be observed that die A is provided with a quarter-round channel 1 disposed with its flat surface 1' uppermost and in the horizontal plane; this channel which extends clear to the rear end of the die is adapted to receive approximately one-half of the bar of half-round stock S from which the tong element is to be formed. Toward the forward end of die A this channel merges into a half-round depression 2 disposed at right angles to the channel 1 and extending to the forward end 3 of the die. The other die is provided with a similar quarter-round channel 4 with its flat surface 4' uppermost adapted to receive the other half of that part of the stock received in channel 1 of die A; this channel 4, however, is not continued to the front end 5 of the die but terminates, substantially opposite the junction of the channels 1 and 2 in die A, in a beveled surface 6 running from the bottom of the channel to the face of die B. Consequently when the two dies are arranged in operative juxtaposed position as shown in Fig. 1 the channels 1 and 4 are adapted to contain, when the dies are forced together, that portion of the stock which constitutes the handle of the tong element and which is therefore not to be shaped by the dies.

Referring now to the second set of dies shown in Figs. 2, 2$^c$ and 2$^d$, Fig. 2 is a front end view of the two dies C and D separated to permit the introduction of the work piece previously shaped from the stock by the first die operation, while Fig. 2$^c$ is a face view of die D and Fig. 2$^d$ a face view of die C. The die C has a half-round channel 7 formed in its face which extends clear to the rear end of the die and is adapted to receive that part of the work piece which is not to be shaped similarly to the channels 1 and 4 in dies A and B; this channel 7 is continued toward the front end 8 of the die in a quarter-round channel 9, an inclined or beveled surface 10 connecting the flat, horizontally disposed face or surface 9' of the channel 9 with the half-round channel 7. The quarter-round channel 9 terminates short of the front end 8 of the die and between it and said end the die is provided with a semi-cylindrical depression 11 corresponding to a similar depression 12 extending inwardly from the front end 13 of the complementary die D. The diameter of the cylindrical cavity formed by the depressions 11 and 12 when the two dies are brought together is preferably considerably greater than the width of the flat face F of the half-round stock from which the tong member is to be formed and which of course approximates the maximum width of the channel 7. The die D is also provided with a quarter-round channel 14 extending from the bottom of the depression 12 and terminating in an inclined transversely extending surface 15 arranged substantially in transverse alignment with the juncture of the channels 7 and 9 in die C. The cylindrical cavity formed by the depressions 11 and 12 when the dies are closed is adapted to receive the heading tool shown in Fig. 7; this tool is externally cylindrical, of a diameter to fit snugly in the cavity and has a flat front end 17 adapted to bottom on the inner end of the cavity when the heading tool is forced longitudinally thereinto. The tool is provided with an axial hollow semi-ellipsoidal cavity 18 extending inwardly from its end 17 adapted to impart to material forced thereinto a substantially semi-ellipsoidal shape.

The dies having been constructed substantially as described and assembled in the forging machine, the operations incident to the formation of the tong members may now be described, and as the two tong members are similar with respect to their handle portions H, H' but slightly different with respect to their jaws designated generally as J, J', reference will first be had to the operations incident to the forming of the member comprising the main jaw J after which I will refer to the operations incident to forming the other member comprising the auxiliary jaw J'.

A piece of half-round stock of sufficient length and proper size to form the member is first selected and raised to a suitable temperature at the end on which the jaw is to be formed. The heated end of the stock is then placed between the dies A and B which are sufficiently separated for this purpose as shown in Fig. 3 with the flat face of the stock uppermost and aligned with the flat faces of the channels 1 and 4, the extremity of the stock being disposed substantially flush with the forward ends 3 and 5 of the dies (Fig. 3ª); desirably the forging machine is provided with a stop or gauge (not shown) to insure the proper positioning of the stock endwise in the dies as will be readily understood. Through suitable operation of the forging machine the dies A and B are then closed together so as to bring their juxtaposed faces into engagement with each other. During this operation the channels 1 and 4 receive and enclose that portion of the work piece which is to form the handle H of the tong member and which is therefore not to be acted upon by the dies, but that portion of the work piece projecting beyond these channels is upset, through the operation of the dies, and formed into a substantially half-round portion U disposed with its flat face F' substantially at right angles to the corresponding face F of the stock as best shown in Figs. 4 and 5 but with its center line X—Y offset below and thus out of coincidence with said face when viewed as in Fig. 4.

The work piece therefore at the completion of the first die operation appears substantially as shown in Figs. 4 and 5 and a primary purpose of the second operation now to be described is to bring the center line X—Y of the upset portion U into substantial coincidence with the flat face F of the stock. To effect this result the work piece is turned through an angle of 90° about its axis and then introduced between the suitably separated second dies with the curved face of the handle portion of the work piece directed toward the channel 7 in die C and with part of the upset portion U lying opposite the channel 9 and the extremity of said upset portion extending into the cavity or depression 11. The position of the work piece in the dies at this time is illustrated in Figs. 6 and 6ᵈ and it will be apparent that as the dies are closed on each other by operation of the forging machine so as to bring their opposed faces into engagement, the handle portion of the work piece will be forced back relatively to the upset portion U into the channels 7 and 9 with the result that the center lines of the flat faces of the stock and of the upset portion are brought into substantial coincidence and the upset portion thus caused to assume a position symmetrical with respect to the handle portion but with its flat face disposed at right angles to the corresponding face of the latter.

In order to form the semi-ellipsoidal head V on the extremity of the jaw, the heading tool shown in Fig. 7 is forced longitudinally into the cylindrical cavity formed by the depressions 11 and 12 in the dies substantially as the latter are being brought together or immediately thereafter, with the result that that portion of the upset portion U which extends into said cavity is brought to the desired shape. Thus, after the tool is withdrawn and the dies opened, a complete, finished jaw substantially of the form shown in Figs. 8, 9 and 10 has been formed on the extremity of the work piece and the tong member is ready, without any further operations, for assembly with the other complementary member to form the tongs save for the drilling of the necessary hole for the reception of the pivot stud by which the members are united together.

The operation of forming the auxiliary jaw J' on the other member is substantially similar to the operation of forming the main jaw heretofore described except that prior to the first die operation the stock is not inserted in the die as far as in the case of the main jaw but only far enough, as indicated by line a—b in Figs. 3ª and 5, so that when it is inserted between dies C and D in the second operation its extremity will lie substantially flush with the bottom of the cylindrical cavity formed by the depressions 11 and 12. Of course since no head is to be formed on the auxiliary jaw, the heading tool is not used at all during its formation; if desired a plain cylindrical plug may be forced into the cylindrical cavity similarly to the manner in which the heading tool is forced thereinto during the operations incident to the formation of the main jaw so as to prevent any of the metal of the upset portion being extruded into the cavity through the pressure of the dies and to insure the proper shape and finish to the end of the auxiliary jaw, but under ordinary conditions the use of such a plug is not required if the end of the stock is initially square.

The main and auxiliary jaws having thus been formed on the respective members of the tongs, the handle portions may be drilled transversely at the proper points for the reception of a pivot stud P by means of which they are pivotally secured together in the well known manner so as to form the completed tongs as shown in Fig. 13.

For convenience of manufacture the two sets of dies are ordinarily disposed one above the other in the die holder of the forging machine so that as soon as the dies A and B are separated after the first die operation is completed the work piece can be withdrawn from between them and then preparatory to the second operation conveniently inserted between the dies C and D, after having been turned as heretofore explained through an angle of 90°, without the necessity of reheating.

It will thus be apparent that in accordance with my novel method of manufacture it is possible to form both the main and auxiliary jaws directly upon and integral with the handles of the tongs and that as both of the jaws are formed by the dies uniformly, with a suitable finish and of the necessary degree of accuracy, the complementary tong members may be assembled immediately to form the tongs without the necessity of any further operations or removal of fins or other bodies of excess metal. In consequence, in accordance with my improved method I am able to produce tongs of the character to which it relates much more rapidly and cheaply than has hitherto been possible while the tongs so produced are as fully satisfactory under practical conditions of use as the tongs heretofore produced by any of the methods known prior to my invention.

While for convenience of description I have herein employed certain terms such as horizontal and the like as denoting position, it is to be understood I have utilized the same in a relative sense only and with reference to the various figures as they appear in the drawings and not in any way in a restricting or limiting sense.

Moreover, while I have herein described with considerable particularity a preferred manner of practising my invention and have illustrated dies of the form which I prefer to use, I do not thereby desire or intend to restrict myself solely thereto as changes and modifications may be made in the operations and sequence thereof incident to the practice of my invention and dies of shapes different from those which I have illustrated and described may be employed if desired to produce tongs having jaws of forms other than those to which I have referred, without departing from the spirit and scope of the invention as defined in the appended claims.

Having thus described my invention, I claim and desire to protect by Letters Patent of the United States:

1. The method of manufacturing pipe tongs adapted for passage through a drawing bell which comprises the steps of forming as an integral unit the jaw and handle of each of the pair of members forming the tongs by upsetting the end of a piece of half-round stock by successive action of a plurality of dies so as to ultimately form thereon a jaw of a shape suitable for cooperation with the corresponding jaw of the other member and then pivoting said members together to form the tongs.

2. The method of manufacturing pipe tongs adapted for passage through a drawing bell which comprises the steps of forming as an integral unit the jaw and handle of each member of a pair of complementary members by subjecting the end of a length of half-round stock to the successive action of different sets of dies to thereby ultimately form a jaw upon the end of the stock adapted for cooperation with a similarly formed jaw on the other member and then pivoting said members together to form the completed tongs.

3. The method of manufacturing pipe tongs which comprises the steps of forming a finished headed jaw at one end of a work piece consisting of a length of half-round stock by subjecting the end of the piece to the successive action of a plurality of dies, forming upon the end of a second work piece comprising a length of half-round stock a finished unheaded jaw adapted for cooperation with the other jaw by subjecting the end of the second work piece to the successive action of a plurality of dies, and then pivoting the two work pieces together to form the completed tongs with the portions of the two pieces which have not been acted upon by the dies forming the handles of the tongs.

4. The method of manufacturing pipe tongs which consists of the steps of forming by successive action of a series of dies a finished headed jaw comprising a flat face on one end of a work piece consisting of a length of half-round stock, similarly forming on the end of another work piece consisting of a length of half-round stock a finished unheaded jaw also comprising a flat face and adapted to cooperate with the jaw on the first piece, and then pivoting the two pieces together with their flat faces in juxtaposed relation to form the completed tongs.

5. In a method of forming as an integral unit the jaw and handle of one member of a pair of tongs, the steps of first upsetting in a die the end of a piece of half-round stock of sufficient length to form the jaw and handle to thereby produce on the stock an upset portion of relatively short length of substantially half-round cross section having its flat face disposed at right angles to the flat face of the stock but with its center line out of coincidence with the plane of said face and then bringing said upset portion by means of a second die to a position with relation to the stock such that the center line of the flat face of the upset portion is substantially coincident with the plane of the flat face of the stock.

6. In a method forming the jaw and handle of one member of a pair of tongs as an integral unit, the steps of first upsetting by means of a set of dies one end of a length of half-round stock so as to form thereon a half-round portion having its flat face disposed substantially at right angles to the corresponding face of the stock but with one of its longitudinal edges more closely adjacent the plane of the flat face of the stock than its other edge, and then by means of another set of dies effecting relative movement of the upset portion with respect to the stock until the longitudinal edges of the flat face of the upset portion are disposed substantially equidistant from and parallel to the flat face of the stock.

7. In a method of forming the jaw and handle of one member of a pair of tongs as an integral unit, the steps of first upsetting one end of a length of half-round stock so as to form thereon a half-round portion having its flat face disposed substantially at right angles to the corresponding face of the stock but with one of its longitudinal edges more closely adjacent the flat face of the stock than its other edge, then effecting relative movement of the upset portion with respect to the stock until the longitudinal edges of the flat face of the upset portion are disposed substantially equidistant from and parallel to the flat face of the stock and substantially simultaneously with said movement forming the extremity of the upset portion into a solid head of substantially cylindrical cross section.

In witness whereof I have hereunto set my hand, this 29 day of May, 1928.

ENOCH B. KIBBY.